(12) United States Patent
Neuhaus et al.

(10) Patent No.: US 8,661,149 B2
(45) Date of Patent: Feb. 25, 2014

(54) COMMUNICATION NETWORK COMPRISING COMMUNICATION COMPONENTS HAVING CLIENT AND SERVER FUNCTIONALITIES AND SEARCH FUNCTIONS

(75) Inventors: Ralf Neuhaus, Lünen (DE); Rainer Uecker, Mülheim (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 1501 days.

(21) Appl. No.: 10/520,681

(22) PCT Filed: Jun. 6, 2003

(86) PCT No.: PCT/DE03/01897
§ 371 (c)(1),
(2), (4) Date: Jan. 7, 2005

(87) PCT Pub. No.: WO2004/006529
PCT Pub. Date: Jan. 15, 2004

(65) Prior Publication Data
US 2005/0267955 A1    Dec. 1, 2005

(30) Foreign Application Priority Data
Jul. 8, 2002    (DE) .................................. 102 30 688

(51) Int. Cl.
*G06F 19/24* (2011.01)
(52) U.S. Cl.
USPC .......................................... 709/230; 709/223
(58) Field of Classification Search
USPC ......... 707/3, 4, 5, 6, 8, 9, 10, 104.1; 370/442, 370/351; 709/230
See application file for complete search history.

(56) References Cited

U.S. PATENT DOCUMENTS

| | | | | |
|---|---|---|---|---|
| 6,065,062 A * | 5/2000 | Periasamy et al. | ............ | 709/242 |
| 6,324,580 B1 * | 11/2001 | Jindal et al. | .................. | 709/228 |
| 6,601,084 B1 * | 7/2003 | Bhaskaran et al. | ........... | 718/105 |
| 7,130,921 B2 * | 10/2006 | Goodman et al. | ............ | 709/244 |
| 7,590,739 B2 * | 9/2009 | Swildens et al. | ............. | 709/226 |
| 2001/0034752 A1 | 10/2001 | Kremien | | |
| 2002/0064147 A1 | 5/2002 | Jonas et al. | | |
| 2002/0073204 A1 | 6/2002 | Dutta et al. | | |

(Continued)

FOREIGN PATENT DOCUMENTS

WO    WO 00/77637 A1    12/2000
WO    WO 01/18641 A1    3/2001

OTHER PUBLICATIONS

U.S. Appl. No. 60/286,225, filed Apr. 24, 2001.*

(Continued)

*Primary Examiner* — Andrew Goldberg
(74) *Attorney, Agent, or Firm* — Buchanan Ingersoll & Rooney PC

(57) ABSTRACT

The invention relates to a communication network, especially a packet-switched communication network, provided with communication components having client and server functionalities. The client functionalities of the communication components have search functions for determining the current addresses of the communication components of the communication network which enable the server functionalities thereof to be used. A plurality of communication components have both client and server functionalities. Information relating to the intrinsic server functionalities can be directly retrieved by means of client functionalities of other communication components and can be directly used.

11 Claims, 1 Drawing Sheet

(56) References Cited

U.S. PATENT DOCUMENTS

| | | | |
|---|---|---|---|
| 2002/0184357 A1* | 12/2002 | Traversat et al. | 709/223 |
| 2003/0050966 A1* | 3/2003 | Dutta et al. | 709/203 |
| 2003/0208621 A1* | 11/2003 | Bowman | 709/242 |
| 2004/0010588 A1* | 1/2004 | Slater et al. | 709/224 |

OTHER PUBLICATIONS

"The Gnutella Protocol Specification v0.4"—Document Revision 1.2, Clip2, http://www.clip2.com protocols@clip2.com, Jul. 4, 2002, pp. 1-10.

* cited by examiner

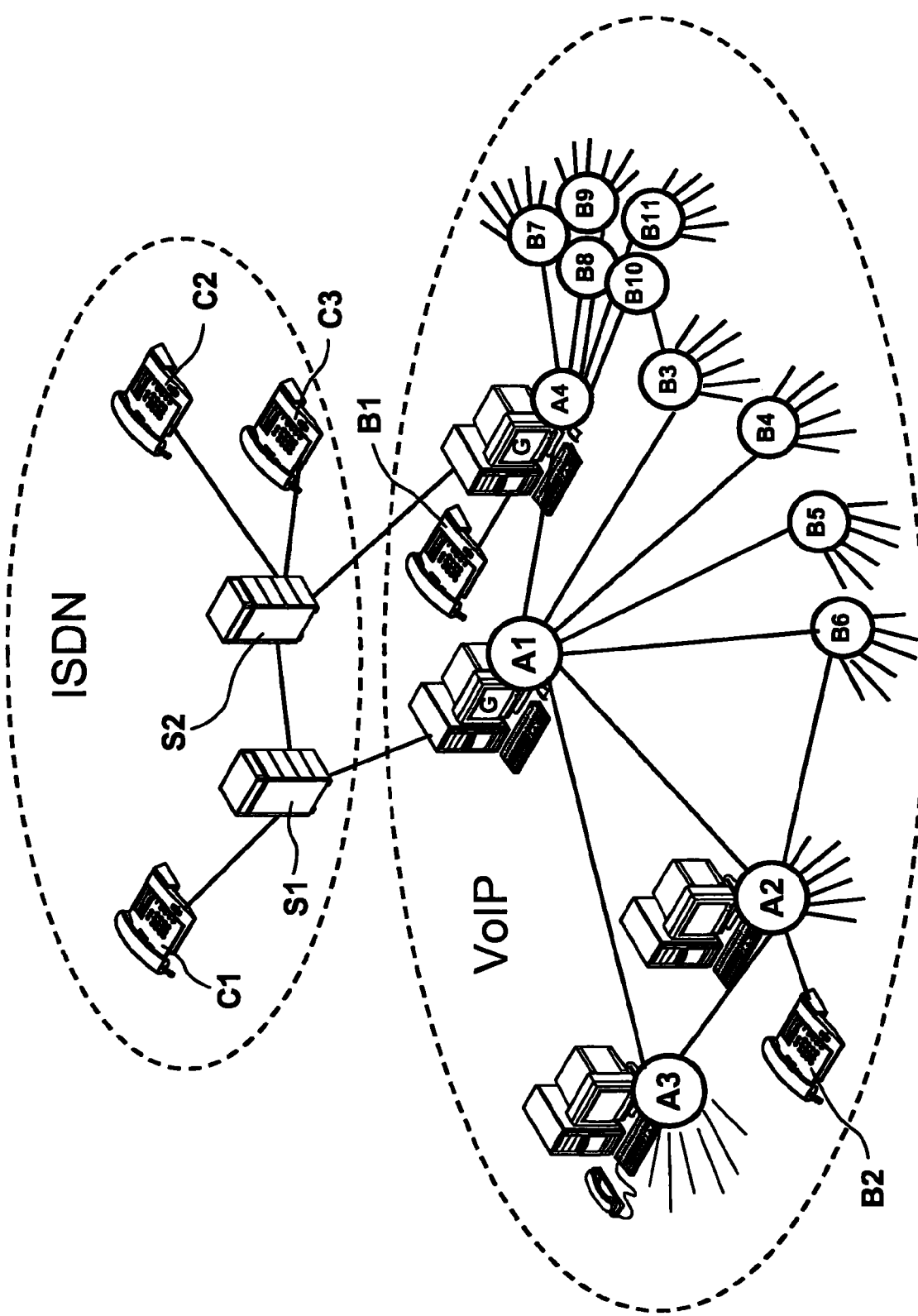

COMMUNICATION NETWORK COMPRISING COMMUNICATION COMPONENTS HAVING CLIENT AND SERVER FUNCTIONALITIES AND SEARCH FUNCTIONS

CROSS REFERENCE TO RELATED APPLICATIONS

This application is the US National Stage of International Application No. PCT/DE03/01897, filed Jun. 6, 2003 and claims the benefit thereof. The International Application claims the benefits of German application No. 10230688.5 DE filed Jul. 8, 2002, both of the applications are incorporated by reference herein in their entirety.

FIELD OF INVENTION

This invention refers to a communication network and a method of communicating in a network comprising communication components having client and server functionalities and search functions.

BACKGROUND OF INVENTION

Communication networks in which communication components are connected to one another via data lines are being used instead of circuit-switching communication networks to an increasing extent. In this case, the communication components are often integrated into data networks which operate on the basis of the Internet protocol (IP networks), which is why such arrangements are also called Voice Over IP (VoIP) networks. In this context, the communication components may be arranged at any geographical location in the network. They transmit the audio signals digitally in the form of numerical information concentrated into data packets, known as voice data packets. For the purpose of interchanging the voice data packets, each communication component has an associated unique network address which is used to address each packet for interchange.

Besides communication components which perform the functionality of terminals known from circuit-switching communication, for example IP telephones, the VoIP communication networks also contain communication components with central functions which can be used alternately or simultaneously by single or a plurality of other communication components. A central communication component of this type, often also referred to as a server component, may provide a directory of all communication terminals, known as client components, which can be reached in the network, for example. If a first client component needs to set up a communication connection to a second client component, the first client component can retrieve from this server component the data which are required to set up the connection, primarily the network address of the second client component. A central server component of this type is frequently also referred to as a "gate keeper". Other central server components, such as voicemail servers, gateways as a link to circuit-switching communication networks, conference facilities and the like, likewise provide central services in the packet-switching network.

The document "The Gnutella Protocol Specification V 0.4", published on the Internet, discloses a method with which communication components on the Internet can be used to find other communication components for the purpose of interchanging files with them. In this case, however, the data interchange takes place not using a central server component or "gatekeeper", but rather directly between the communication components. Networks which provide direct data interchange between communication components without a superordinate entity are called Peer-to-Peer networks. The communication components which comprise both client and server functionalities are frequently called "servents" in the literature.

In the Peer-to-Peer network based on the Gnutella specification, each communication component—which is a PC in this case—holds files ready for interchange with other communication components. In order to be able to interchange data, a searching communication component requires the network address of another communication component which holds the sought file ready for retrieval. To this end, the searching communication component first of all sends a first search message, the "ping". The communication components which receive a "ping" search message of this type respond to the searching communication component with a hit response, the "pong". This hit response contains the network address of the responding communication component and also the number of files provided by this communication component for interchange. In the next step, the searching communication component sends a second search message "query" to a limited selection of those communication components which have responded to the "ping" search message with a "pong". This second search message already contains the file name of the file which is being sought. If a communication component receives a second search message "query" but does not itself hold the sought file ready for interchange, it forwards this search message to other communication components in the network whose addresses it has ascertained by means of a "ping" method which has already been carried out in the past, for example. If the communication component can provide the desired file for interchange, however, then it responds to the second search message "query" with a second hit response "query hit", as a result of which the searching communication component can initiate the file transfer using commands defined in the Internet protocol.

The document US 2002/0073204 A1, Dutta et al. "Method and system for exchange of node characteristics for data sharing in peer-to-peer data networks" shows a packet-switched network containing communication components (in this case: computers) in which the computers interchange files with one another. In this arrangement, the files are sought and transferred on the basis of the Gnutella protocol. In this context, the user of a computer is shown characteristic information about another computer which has been found, this information relating firstly to the access parameters for the computers found and secondly comprising information about the files which are stored on these computers and can be used for file interchange. This information is shown to the user, so that the user can then decide whether a connection to the computer found needs to remain for the purpose of file interchange or whether this connection is to be cleared down.

When a client component requires the services of a server component of a particular type, there are often a plurality of server components of this type available in packet-switching networks. The client component stores a table which contains, arranged according to type, every accessible server component with its network address and the other information required for access. For each type of server component, one of these components is marked in the table as "default component", that is to say as that component which is contacted first. If this default component is not available or cannot provide the adequate service features, then the next communication component is selected from the stored table in a defined order and is contacted. This process is repeated until a suitable, sufficiently powerful server component which is available at this time has been found.

The known packet-switching communication networks have been found to have the drawback that various server components of the same type are always having to be contacted in succession in a previously defined order. When adding or removing new client and server components, extensive administration processes are then required in each case.

SUMMARY OF INVENTION

It is an object of the invention to reduce the complexity required for administration of communication networks and, in particular, to optimize the selection of server components when a plurality of components of the same type can be used as alternatives.

The invention achieves the object by means of the features of the claims.

To achieve the object, a plurality of communication components have both client and server functionalities, with information about the proprietary server functionalities being able to be retrieved directly and used directly by the client functionalities of other communication components. As a result, the server functionalities of the communication components can be used by all clients without the need for the server functionalities to be publicized explicitly in the network. The simultaneous use of a large number of server functionalities distributed in the communication network results overall in a high level of performance given a high level of redundancy or fail safety.

Advantageous refinements of the invention are specified in the claims.

The complexity for administration of the communication network is reduced, in particular, in arrangement with frequently changing communication components and when there are changes in the network structure if the communication network with the communication components administers itself using the information ascertained by the search functions.

Fail safety is increased by virtue of a server functionality being able to be present a plurality of times in the communication network and in a plurality of communication components. As a result, functionalities may also be arranged or distributed in the communication network on the basis of geographical requirements.

When server functionalities are present a plurality of times, state information is used to select one of these server functionalities for use, and this avoids pointlessly contacting components which are already utilized to the full extent.

The utilization level and the costs of using server functionalities may be optimized by virtue of the state information comprising the current utilization level of the server functionalities which are present a plurality of times and/or the costs for using them.

If a client functionality retrieves an authorization before using a server functionality, it is possible to limit access to services which incur costs and to implement a data protection concept.

Authorization for accessing server functionalities can easily be administered if authorizations are managed by at least one server functionality.

BRIEF DESCRIPTION OF THE DRAWINGS

An exemplary embodiment of a communication network based on the invention is described below with reference to the drawing.

The single FIGURE shows a schematic illustration of a packet-switching communication network which is connected to a circuit-switching communication network.

DETAILED DESCRIPTION OF INVENTION

Communication components A1-A4, B1-B11 in a packet-switching communication network VoIP are connected to one another.

The communication components A1-A4, B3-B11 are servents, that is to say communication components which have both client and server functionalities. The components B1, B2 are "simple" IP telephones, that is to say components with pure client functionality.

The communication components A1, A4 contain, as a server functionality, gateways which connect the packet-switching communication network VoIP to the circuit-switching network ISDN. The gateways installed on the communication components A1 and A4 are situated at various locations in the communication network VoIP and also in different secondary distribution network areas of the circuit-switching communication network ISDN. The gateways permit connections between the communication components A1-A4, B1-B11 and the circuit-switching communication systems S1, S2 and hence the ISDN terminals C1-C3 connected thereto.

The gateways installed on the communication components A1, A4 may be selected and used by the client components B1, B2 and also by all client components installed in the packet-switching communication network VoIP on the communication components A1-A4, B3-B11 predominantly in the form of software applications. To this end, all communication components A1-A4, B3-B11 have communication software installed on them which both provides the client functionality and examines the proprietary communication component A1-A4, B3-B11 to determine what server functionalities it can provide. The latter is done at least when the communication software is started for the first time. This information is then stored such that it can be retrieved by other communication components A1-A4, B3-B11 using appropriate search methods.

In the case of communication connections from the packet-switching communication network VoIP to the circuit-switching communication network ISDN, selecting that gateway (for example on the basis of the location of the called subscriber C1-C3) which has the closest connection to the communication installation S1, S2 to which the desired terminal C1-C3 is connected results in cheaper connection costs. For this reason, a gateway which is linked to the circuit-switching communication network ISDN in the secondary distribution network area of the called subscriber is always used. To make use of such cost advantages through the selection of the appropriate gateway, the communication software installed on the communication components A1-A4, B3-B11 is equipped with a software module for optimizing connection costs, a "least cost routing" module (LCR module). This module selects the gateway installed on the communication component A1 for connections to the terminal C1 and selects the gateway installed on the communication component A2 for connection to the terminals C2, C3.

Although the "simple" communication components B1, B2 are permanently associated with a respective one of the gateways in this case, IP telephones B1, B2 may, in principle, also be equipped with the search functions and LCR modules described.

To be able to select the gateway, it is first necessary for the communication component A1-A4, B1-B11 to have been initialized, which will be described below by way of example for the communication component A1.

When the communication component A1 is first started, the communication software on the communication component A1 searches its own PC hardware for communication resources. The resources, which may be both client and server functionalities, are then stored in a local resource table. In the case of the communication components A1, A4, these are ISDN cards which are connected to the circuit-switching communication network ISDN by means of a respective S0 base connection. This allows these cards to be used as gateways.

In the next step, the communication component A1 sets up a connection to a licensed server component (not shown here). The licensed server then provides the information which reveals what resources the communication component A1 provides to its own client component and to the other communication components A2-A4, B1-B11 and what resources of what type on the other communication components A2-A4, B3-B11 may be used by this communication component A1. Using this information, the communication component A1 provides, in a "capabilities data record", a list containing all proprietary provided resources for retrieval by other communication components A2-A4, B3-B11.

After the proprietary resources of this communication component A1 are retrievable and usable by adjacent communication components A2-A4, B1-B11, the component A1 starts the search for "neighboring" communication components A2-A4, B3-B6. In the course of this search, the communication component A1 creates a list of neighboring communication components A2-A4, B3-B6 found in order to speed up subsequent search operations for resources.

In this way, the gateways installed on the two communication components A1, A4 may also be found and used.

The search method is described below by way of example using the setup of a telephone connection between the communication component A3 in the packet-switching communication network VoIP and the telephone C1 in the circuit-switching communication network ISDN.

To this end, the communication component A3, as a client component, has a telephony function. To connect across networks, it requires a gateway, such as is installed on the communication components A1 and A4. To find one of these gateways, the communication component A3 sends a search query to the "neighbors" listed in its "servent list". This search query is received by the communication components A1 and A2, with the communication component A1 using the gateway installed on it to return to the communication component A3 a hit response containing the information which is relevant to use. By contrast, the communication component A2 does not have a gateway and forwards the search query to neighboring communication components which are known to it, in this case the communication components B6 and A4. Since the communication component A4 also has a gateway, it returns an appropriate hit response to the communication component A3. This now has the use-related information from two gateways available, which are entered into a list of available gateways in the communication component A3.

This list has been sorted according to use-related information, in this case primarily according to the number of available channels on the gateway and only secondarily according to the propagation time for the hit response in the network, which is a measure of the "distance" of this communication component in the packet-switching communication network VoIP. The use-related information from the gateways includes, as a geographical statement, the secondary distribution network area of the circuit-switching communication network ISDN, in which area said network is linked to the circuit-switching communication network ISDN. To optimize costs, the LCR module installed in the communication component A3 selects the gateway located on the communication component A1 for the connection via the circuit-switching communication installation S1 to the terminal C1, because this connection can be used as the "local tariff".

The list of gateways found is kept in the communication component A3 for setting up further connections and is available for retrieval by other communication components A1, A2, A4, B3-B11.

The search functions used to create lists of the adjacent communication components and of the server components available in the packet-switching communication network VoIP are restarted at regular intervals. This prevents communication components A1-A4, B3-B11 which have failed or have been removed from the packet-switching communication network VoIP in the meantime from being contacted in vain or newly added communication components from not being used. Nevertheless, if there is a futile connection attempt made for a client or else a server component, the lists are likewise updated by newly started search operations.

In the present case, the regular timed update takes place at short intervals of time, because the lists of the available server components also comprise an entry about the current utilization level of each communication component, which utilization level serves as a further criterion for selecting a particular server component from a plurality of server components. A further reason for regular updating of the lists is that people can log onto any communication component in the packet-switching communication network VoIP using a fixed name and a fixed internal telephone number. This function is used in company networks, for example, for flexible workstation dialing or for forming workgroups for a short period. All client components in the same workgroup can then have a display connected to show each member of the group with status details, e.g. "logged on", "busy" etc., and which can be used to call said member by means of a "mouse click".

The invention claimed is:
1. A communication network comprising:
a plurality of communication devices, at least some of which comprise both client and server functionalities, at least some of the client functionalities including a search function that ascertains network addresses of others of the communication devices that allow the server functionalities of the others to be used; and
a retrieval mechanism in said at least some of the client functionalities that obtains information about the server functionalities of said other communication devices;
wherein the server functionalities provide usable services in the communication network;
wherein a server functionality is selected for use by a client functionality using a state information comprising a current utilization level of each of the server functionalities and the cost to use each of the server functionalities;
wherein each of the communication devices searches for neighboring ones of the communication devices and creates a servant list of the neighboring communication devices;
wherein each of the communication devices maintains the current utilization level of each server functionality of the neighboring communication devices in the servant list by performing a repeating search at timed intervals;
wherein one of the communication devices performs a gateway search for a gateway among the neighboring communication devices in the servant list;

wherein a first of the neighboring communication devices comprises a first gateway, and returns a first hit response to said one communication device;

wherein a second of the neighboring communication devices does not comprise a gateway, and forwards the gateway search to additional neighboring communication devices of the second neighboring communication device;

wherein one of the additional neighboring communication devices comprises a second gateway, and returns a second hit response to said one communication device; and wherein said one of the communication devices chooses one of the gateways for use based on a respective number of available channels on each gateway and a respective propagation time for the first and second hit responses.

2. The communication network as claimed in claim 1, wherein the communication network provides for a self-administration on the basis of the information ascertained by the search functions.

3. The communication network as claimed in claim 1, wherein the client functionality is designed to retrieve an authorization before using a server functionality.

4. The communication network as claimed in claim 3, wherein at least one server functionality is provided for managing the authorization.

5. A method of communication within a network, comprising:

providing a plurality of communication devices with both client and server functionalities;

ascertaining via a search function of the client functionality of at least some of the communication devices an address of at least some others of the communication devices that allow the server functionalities of said some others to be used; and retrieving information about the server functionality of said some others of the communication devices by the client functionality of said at least some of the communication devices;

wherein the server functionalities provide services in the communication network, wherein one of the server functionalities is selected for use by one of the client functionalities using a state information comprising a current utilization level of each of the server functionalities and the cost to use each of the server functionalities;

wherein each of the communication devices searches for neighboring ones of the communication devices and creates a servant list of the neighboring communication devices;

wherein each of the communication devices maintains the current utilization level of each server functionality of the neighboring communication devices in the servant list by performing a repeating search at timed intervals;

wherein one of the communication devices performs a gateway search for a gateway among the neighboring communication devices in the servant list;

wherein a first of the neighboring communication devices comprises a first gateway, and returns a first hit response to said one communication device;

wherein a second of the neighboring communication devices does not comprise a gateway, and forwards the gateway search to additional neighboring communication devices of the second neighboring communication device;

wherein one of the additional neighboring communication devices comprises a second gateway, and returns a second hit response to said one communication device; and wherein said one of the communication devices chooses one of the gateways for use based on a respective number of available channels on each gateway and a respective propagation time for the first and second hit responses.

6. The method as claimed in claim 5, further comprising providing a self-administration based on the information ascertained by the search functions.

7. The method as claimed in claim 5, wherein a plurality of search functions are contained in the communication network and in the communication devices.

8. The method as claimed in claim 5, wherein the client functionality is designed to retrieve an authorization before using a server functionality.

9. The method as claimed in claim 8, wherein at least one server functionality is provided for managing the authorization.

10. The method as claimed in claim 5, wherein the current address of all of the communication devices are ascertained.

11. The method as claimed in claim 5, wherein the server functionality of all of the communication devices are retrieved.

\* \* \* \* \*